Patented June 14, 1932

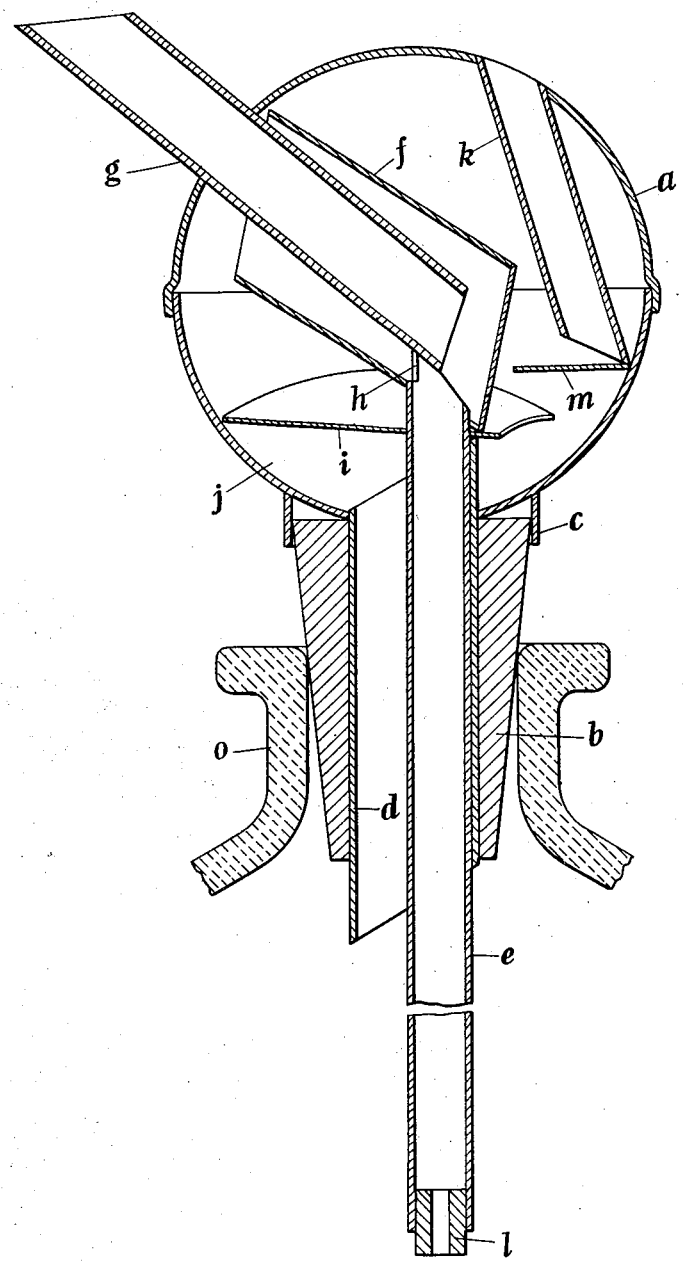

1,862,801

UNITED STATES PATENT OFFICE

LAWRENCE TEMPLE PAYNE AND HAROLD GEORGE CONRADE, OF BIRMINGHAM, ENGLAND

APPARATUS FOR DELIVERING MEASURED QUANTITIES OF LIQUID BY VOLUME FROM BOTTLES OR SIMILAR VESSELS

Application filed August 6, 1931, Serial No. 555,596, and in Great Britain August 5, 1930.

This invention has for its object to provide an improved liquid measuring device.

The invention comprises the combination with a hollow body part containing a siphon, of a partition plate which divides the body part into a measuring chamber communicating with the outlet, and a compartment communicating with the liquid supply conduit, the arrangement of the partition plate being such that the said compartment must be filled before liquid can flow into the measuring chamber.

Also the invention comprises the arrangement of the air pipe by which air is admitted to the receptacle containing the liquid, so that one end opens directly into the closed end of the siphon.

Further the invention comprises an air vent tube situated within the measuring chamber and having its inner end protected by a baffle.

The accompanying drawing shows in section a measuring device constructed in accordance with this invention.

The body part $a$ of the device is of spherical form. At one side of the body there is provided a cork $b$ for effecting connection with the neck $o$ of a bottle or other receptacle. The cork may be enclosed at one end by a metal ring $c$ attached to the body.

Through the cork passes the supply conduit $d$ along which fluid can flow from the receptacle to the measuring chamber, and through this conduit passes the air pipe $e$ by which air can flow into the receptacle, the end of the air pipe within the receptacle being partially closed by a restriction $l$.

Within the measuring chamber is arranged the usual siphon $f$ consisting of a hollow cylindrical body having a closed end. The delivery pipe $g$ which extends beyond the body $a$ has its inner end enclosed by the siphon.

The air pipe terminates in the closed end of the siphon near the inner end of the delivery pipe, to enable the whole of the siphon contents to drain back into the receptacle when the device occupies the vertical position shown in the drawing. A notch is formed in the air pipe at the position indicated by $h$, to allow the air pipe to drain into the measuring chamber.

The interior of the body $a$ is divided by a partition plate $i$ which forms a compartment $j$ immediately adjacent to the supply conduit, the latter being situated well below the upper edge of the partition when the receptacle and its attached measuring device are tilted in the direction for discharging a measured quantity of liquid. The chamber on the other side of the partition forms the measuring chamber.

At one side of the closed end of the siphon the body part is provided with a vent tube $k$ which is contained entirely within the body part, its inner end being protected by a baffle $m$ which prevents liquid from splashing into the vent.

To withdraw a measured quantity of liquid from the receptacle the latter is tilted so as to bring the delivery pipe nearly vertical with its outer end lowermost. Liquid now flows into the compartment $j$ through the supply conduit until the compartment is filled, and then it flows over the upper edge of the plate $i$ into the measuring chamber. Displaced air can escape through the vent, and also pass along the air pipe into the receptacle. When the upper surface of the liquid reaches the top of the siphon and blocks the adjacent end of the air pipe, further flow of liquid from the receptacle ceases and the discharge of liquid through the delivery pipe commences. This discharge continues until the level of the liquid in the measuring chamber has fallen below the lower edge of the siphon. Air can then again enter the air pipe and unless the receptacle is returned to its normal position, the chamber will be re-charged and the cycle of operations will be repeated.

By the use of the partition $i$ forming a kind of weir over which the liquid must flow from the compartment $j$ to the measuring chamber, we are able in a very simple and convenient manner to minimize irregularities in the accuracy of the measuring device due to variations in the quantity of liquid in the receptacle. Also by arranging the parts as shown we are able to ensure complete draining of residual liquid from the measuring device back to the receptacle. Moreover the combination of parts described enables us to place the vent entirely within the body and so avoid any external obstruction other than the delivery pipe or spout.

Having thus described our invention what we claim as new and desire to secure by Letters Patent is:

1. In liquid measuring devices, the combination with a hollow body part containing a siphon, of a partition plate which divides the body part into a measuring chamber communicating with the outlet, and a compartment communicating with the liquid supply conduit, the arrangement of the partition plate being such that the said compartment must be filled before liquid can flow into the measuring chamber, substantially as described.

2. In liquid measuring devices as claimed in claim 1, the combination with the measuring chamber, of an air vent tube situated within the said chamber, and a baffle protecting the inner end of the tube, substantially as described.

In testimony whereof we have signed our names to this specification.

LAWRENCE TEMPLE PAYNE.
HAROLD GEORGE CONRADE.